(12) United States Patent
Xu et al.

(10) Patent No.: US 11,768,526 B2
(45) Date of Patent: Sep. 26, 2023

(54) ELECTRONIC DEVICE

(71) Applicant: Lenovo (Beijing) Limited, Beijing (CN)

(72) Inventors: Yuling Xu, Beijing (CN); Dafei Mo, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 29 days.

(21) Appl. No.: 17/688,534

(22) Filed: Mar. 7, 2022

(65) Prior Publication Data
US 2023/0062101 A1 Mar. 2, 2023

(30) Foreign Application Priority Data
Aug. 30, 2021 (CN) .......................... 202111002567.9

(51) Int. Cl.
*G06F 1/16* (2006.01)

(52) U.S. Cl.
CPC ................................. *G06F 1/1698* (2013.01); *G06F 1/1616* (2013.01)

(58) Field of Classification Search
CPC ...................................................... G06F 1/1698
See application file for complete search history.

(56) References Cited

U.S. PATENT DOCUMENTS

| | | | | |
|---|---|---|---|---|
| 6,456,499 | B1* | 9/2002 | Nakajima et al. ... | H01Q 1/2266 361/752 |
| 6,879,293 | B2* | 4/2005 | Sato ...................... | H01Q 13/10 343/702 |
| 6,959,209 | B2* | 10/2005 | Fang ...................... | H01Q 21/24 455/574 |
| 8,896,487 | B2* | 11/2014 | Chiang et al. ........ | H01Q 1/2266 343/702 |
| 9,972,892 | B2* | 5/2018 | Noori et al. ........... | H01Q 19/10 |
| 10,200,105 | B2* | 2/2019 | Hu et al. ............... | H04B 1/401 |
| 10,218,052 | B2* | 2/2019 | Pascolini et al. ...... | H01Q 1/243 |
| 10,218,065 | B2* | 2/2019 | Lee et al. .............. | H01Q 1/243 |
| 10,228,721 | B2* | 3/2019 | Farahani et al. ...... | G06F 1/1637 |
| 10,290,946 | B2* | 5/2019 | Romano et al. ....... | H01Q 13/18 |
| 10,483,620 | B2* | 11/2019 | Rappoport et al. ......................... | B29C 45/14819 |
| 10,720,693 | B2* | 7/2020 | Yamamoto et al. .. | G06F 1/1616 |
| 11,069,265 | B2* | 7/2021 | Jung et al. ............ | G06F 1/1652 |
| 11,165,159 | B2* | 11/2021 | Hung .................. | H01Q 1/2266 |

(Continued)

*Primary Examiner* — Adrian S Wilson
(74) *Attorney, Agent, or Firm* — ANOVA LAW GROUP, PLLC (57) ABSTRACT

An electronic device is provided in the present disclosure. The electronic device includes a first main body having a first metal shell and a second main body having a second metal shell, where the first metal shell has a first slot; and the second metal shell has a second slot; and further includes an antenna circuit disposed in the first metal shell, where the antenna circuit has a radiator; and the radiator and the first slot satisfy a coupling condition. In response to being in a first state, the radiator and the second slot satisfy the coupling condition, and the radiator radiates a signal through the first slot and the second slot, simultaneously; and in response to being in a second state, the first slot and the second slot do not satisfy the coupling condition, and the radiator radiates the signal through the first slot.

15 Claims, 4 Drawing Sheets

(56) References Cited

U.S. PATENT DOCUMENTS

| | | | |
|---|---|---|---|
| 11,211,690 B2* | 12/2021 | Chen et al. | H04M 1/026 |
| 2002/0113741 A1* | 8/2002 | Asano et al. | H01Q 1/2266 |
| | | | 343/702 |
| 2010/0238621 A1* | 9/2010 | Tracy et al. | G06F 1/1698 |
| | | | 264/272.11 |
| 2013/0285516 A1* | 10/2013 | Mizoguchi et al. | G06F 1/1637 |
| | | | 312/223.1 |
| 2017/0142241 A1* | 5/2017 | Kim et al. | H04M 1/026 |
| 2017/0176793 A1* | 6/2017 | Choi et al. | H01L 27/124 |
| 2018/0038948 A1* | 2/2018 | Kemppinen | G06F 1/1624 |
| 2018/0375189 A1* | 12/2018 | Hawaka et al. | H01Q 1/526 |
| 2019/0140342 A1* | 5/2019 | Lim et al. | H01Q 5/335 |
| 2019/0148816 A1* | 5/2019 | Chen et al. | H01Q 1/44 |
| | | | 343/702 |
| 2019/0237848 A1* | 8/2019 | Ramasamy et al. | G06F 1/1683 |
| 2020/0051468 A1* | 2/2020 | Jung et al. | H01Q 21/30 |
| 2020/0106157 A1* | 4/2020 | Tran | H01Q 1/2291 |
| 2021/0194138 A1* | 6/2021 | Hung | H01Q 9/42 |

* cited by examiner

ELECTRONIC DEVICE

CROSS-REFERENCE TO RELATED APPLICATION

This application claims the priority of Chinese Patent Application No. 202111002567.9, filed on Aug. 30, 2021, in the China National Intellectual Property Administration, the content of which is incorporated herein by reference in its entirety.

TECHNICAL FIELD

The present disclosure generally relates to the field of communication technology, and, more particularly, relates to an electronic device.

BACKGROUND

With continuous development of science and technology, more electronic devices with wireless communication function are widely used and bring great convenience for use.

The main component of an electronic device to realize wireless communication function is an antenna. For a foldable electronic device, the metal shell of the electronic device may change working environment of the antenna in certain folded states, thereby affecting antenna communication quality.

SUMMARY

One aspect of the present disclosure provides an electronic device. The electronic device includes a first main body and a second main body which move relative to each other, where the first main body has a first functional surface and a first metal shell facing away from the first functional surface; the second main body has a second functional surface and a second metal shell facing away from the second functional surface; the first metal shell has a first slot; and the second metal shell has a second slot; and further includes an antenna circuit disposed in the first metal shell, where the antenna circuit has a radiator; and the radiator and the first slot satisfy a coupling condition. The electronic device has a first state and a second state; in response to being in the first state, the radiator and the second slot satisfy the coupling condition, and the radiator radiates a signal through the first slot and the second slot, simultaneously; and in response to being in the second state, the first slot and the second slot do not satisfy the coupling condition, and the radiator radiates the signal through the first slot.

BRIEF DESCRIPTION OF THE DRAWINGS

To clearly describe the technical solutions of various embodiments of the present disclosure, the drawings need to be used for describing various embodiments are described below. Obviously, the drawings in the following description are merely some embodiments of the present disclosure. For those skilled in the art, other drawings may be obtained in accordance with these drawings without creative efforts.

The structures, proportions, sizes and the like shown in the drawings in the present disclosure are merely used to cooperate with the contents disclosed in the specification for those skilled in the art to understand the present disclosure and are not intended to limit the implementable condition of the present disclosure and thus have no substantive technical significance. Any modifications of structures, changes of proportional relationship or adjustments of sizes, without affecting the generated effect and achievable objective of the present disclosure, should still fall within the scope that the technical content disclosed in the present disclosure can cover.

DETAILED DESCRIPTION

The technical solutions in embodiments of the present disclosure are clearly and completely described below with reference to the accompanying drawings in embodiments of the present disclosure. Obviously, described embodiments are only a part of embodiments of the present disclosure, but not all embodiments. Based on embodiments in the present disclosure, all other embodiments obtained by those skilled in the art without creative efforts shall fall within the protection scope of the present disclosure.

For a foldable electronic device, taking a notebook computer as an example, the display screen main body and the keyboard main body may be rotated 360° relative to each other. In response to the display screen main body and the keyboard main body having an angle greater than 0° and less than 180°, the working mode may be a notebook mode; in response to the display screen main body and the keyboard main body having a 360° angle, the working mode may be a tablet mode; and in response to the display screen main body and the keyboard main body having an angle of 0°, the working mode may be a shutdown or standby mode.

TABLE 1

| Band | Frequency/MHz | Channel | Bandwidth/MHz | Notebook mode radiation power/dBm | Tablet mode radiation power/dBm | Power difference/dBm |
| --- | --- | --- | --- | --- | --- | --- |
| LTE FDD B2 | 1851.58 | 18650 | 10 | 21.5 | 18.9 | -2.6 |
| LTE FDD B2 | 1880 | 18900 | | 21.4 | 18.8 | -2.6 |
| LTE FDD B2 | 1908.42 | 19150 | | 20.8 | 17.6 | -3.2 |
| LTE FDD B5 | 825.58 | 20450 | 10 | 22 | 16.2 | -5.8 |
| LTE FDD B5 | 836.5 | 20525 | | 21.8 | 16.2 | -5.6 |
| LTE FDD B5 | 847.42 | 20600 | | 21.4 | 16.1 | -5.3 |
| LTE FDD B13 | 778.58 | 23230 | 10 | 21.6 | 14.3 | -7.3 |

TABLE 1-continued

| Band | Frequency/ MHz | Channel | Bandwidth /MHz | Notebook mode radiation power/ dBm | Tablet mode radiation power/ dBm | Power difference/ dBm |
|---|---|---|---|---|---|---|
| LTE FDD B13 | 785.42 | 23230 | | 21.7 | 14.3 | -7.4 |
| LTE FDD B13 | 784.5 | 23230 | | 21.5 | 14.1 | -7.4 |
| LTE FDD B66 | 1711.58 | 13222 | 10 | 22 | 18.1 | -3.9 |
| LTE FDD B66 | 1745 | 132322 | | 22.4 | 19.3 | -3.1 |
| LTE FDD B66 | 1778.42 | 132622 | | 22 | 19.5 | -2.5 |

Notebook computers need to ensure that the antenna performance standards are consistent under different folded states, thereby ensuring stable and reliable wireless communication performance of the notebook computer. However, for the notebook computer with a metal shell, when the display screen main body and the keyboard main body are folded at a large angle, that is, when the metal shell of the display screen main body is opposite to the metal shell of the keyboard main body and the distance between these two metal shells is small, the antenna performance may be degraded by environmental medium interference due to relatively large changes in antenna working environment, which may result in a frequency offset of the antenna and affect communication quality.

For a same notebook computer, in the tablet mode, the metal shell of the display screen main body is opposite to the metal shell of the keyboard main body and the distance between these two metal shells is small, such that the radiation power of the antenna may be reduced, thereby affecting communication quality. As shown in Table 1, especially in relatively low operating frequency bands, the radiation power difference between two modes may be above 7dBm.

In the notebook computer, the antenna is normally disposed in the metal shell of the keyboard main body. To avoid the influence of the metal shell on the antenna performance, setting a coupling slot on the metal shell of the keyboard main body can ensure the communication performance in the notebook computer mode. However, in the tablet mode, the metal shell of the keyboard main body may be opposite to the metal shell of the display screen main body and the distance between these two metal shells may be small, so that the metal shell of the display screen main body may interfere with radiation performance of the slot in the metal shell of the keyboard main body. In the existing technology, the antenna is normally disposed on the side adjacent to keys to be far away from the metal shell of the keyboard main body. In such way, when the display screen main body and the keyboard main body are closed to be in shutdown or standby mode, the influence of the metal shell of the display screen main body on the antenna performance may be ignored because the requirement for the antenna communication performance is not high at this point. When in the notebook computer mode or tablet computer mode, the antenna may not be interfered by the metal shell of the display screen main body in such design manner, which may consider the requirements of antenna performance of electronic devices in different folded states and improve user experience.

Embodiments of the present disclosure provide an electronic device. An antenna may not need to be configured on the side adjacent to the functional surface of the electronic device. For the electronic device, the first slot may be configured on the first metal shell of the first main body, and the second slot may be configured on the second metal shell of the second main body. In such way, in the second state, a radiator and the first slot may be used as the first antenna; and in the first state, the radiator, the first slot and the second slot may be used as the second antenna. In different folded states, the radiator may be coupled with a corresponding slot, which may reduce adverse effect of the metal shell on the antenna working environment and ensure the communication quality of the antenna.

It should be noted that, in embodiments of the present disclosure, the notebook computer may be used as an example for description. Obviously, the electronic device in embodiments of the present disclosure may not be limited to the notebook computer but may also include other foldable electronic devices, such as a foldable smartphone, a tablet computer, a smart wearable device, and/or the like.

To make above objectives, features and advantages of the present disclosure more clearly, the present disclosure is further described in detail below with reference to accompanying drawings and embodiments.

Figure 1:
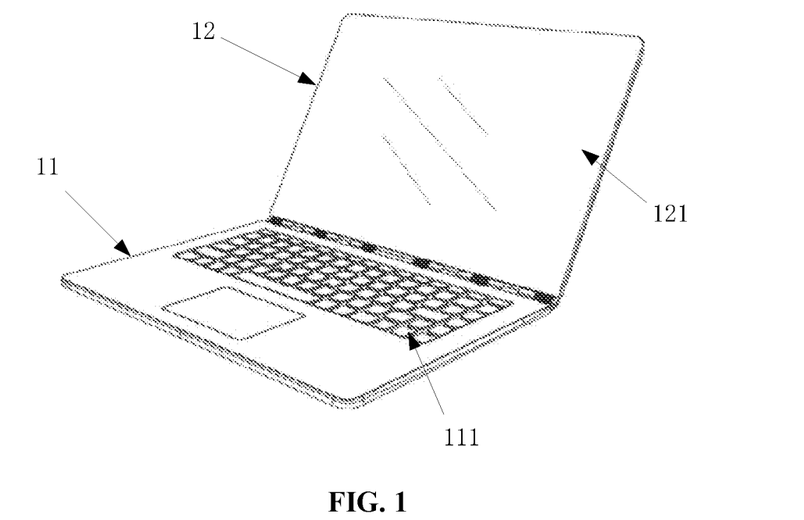
FIG. 1 illustrates a structural schematic of an electronic device in a first folded state according to various disclosed embodiments of the present disclosure.
Figure 2:
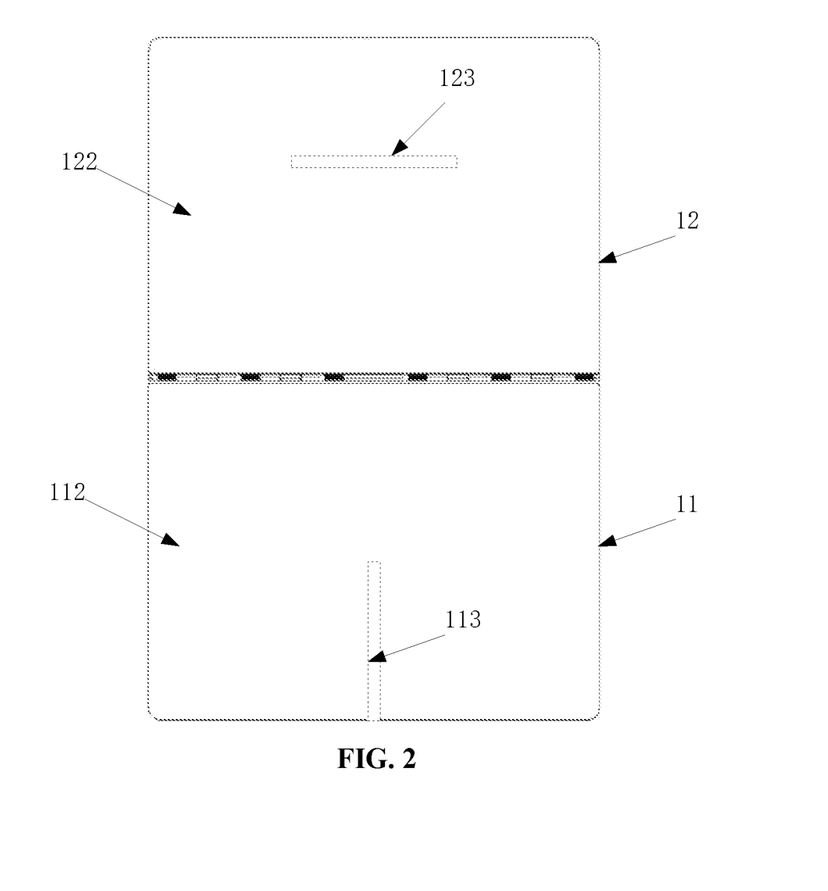
FIG. 2 illustrates a structural schematic of an electronic device in a second folded state according to various disclosed embodiments of the present disclosure.

FIG. 1 illustrates a structural schematic of an electronic device in the first folded state according to various disclosed embodiments of the present disclosure; and FIG. 2 illustrates a structural schematic of an electronic device in the second folded state according to various disclosed embodiments of the present disclosure. The electronic device may include the first main body 11 and the second main body 12 that may move relative to each other. The first main body 11 may have the first functional surface 111 and the first metal shell 112 facing away from the first functional surface 111; and the second main body 12 may have the second functional surface 121 and the second metal shell 122 facing away from the second functional surface 121. The first metal shell 112 may have the first slot 113, and the second metal shell 122 may have the second slot 123. The electronic device may further include an antenna circuit disposed in the first metal shell 112. The antenna circuit may have a radiator; and the radiator and the first slot 113 may satisfy a coupling condition. The radiator may be configured as an antenna pattern structure with a preset shape based on requirements.

The electronic device may have the first state and the second state. In response to being in the first state, the radiator and the second slot 123 may satisfy the coupling condition, and the radiator may radiate a signal through the first slot 113 and the second slot 123, simultaneously. In response to being in the second state, the first slot 113 and the second slot 123 may not satisfy the coupling condition, and the radiator may radiate the signal through the first slot 113.

In such way, in the second state, the radiator and the first slot 113 may be used as the first antenna; and in the first state, the radiator, the first slot 113 and the second slot 123 may be used as a second antenna. In different folded states, the radiator may be coupled with a corresponding slot, which may reduce adverse effect of the metal shell on the antenna working environment and ensure the communication quality of the antenna.

In the electronic device, the first main body 11 and the second main body 12 may move relative to each other. For example, the first main body 11 and the second main body 12 may be rotationally connected, such that the first functional surface 111 and the second functional surface 121 may be folded between 0° and 360°. When the first functional surface 111 and the second functional surface 121 satisfy a coplanarity condition, that is, the angle therebetween is 180° or approximately 180°, the first metal shell 112 and the second metal shell 122 may be located at a same side of the electronic device. In other manners, the first main body 11 and the second main body 12 may also be detachably connected and fixed by a magnetic element or a locking element; and the first functional surface 111 and the second functional surface 121 may be fixed at different angle positions by the locking element or the magnetic element, thereby changing the angle between the first main body 11 and the second main body 12.

In the electronic device of embodiments of the present disclosure, the minimum distance between the radiator and the first slot 113 may not be greater than a set threshold, so that the radiator and the first slot 113 may satisfy the coupling condition. The set threshold may be configured based on the communication performance of the antenna, for example, the set threshold may be configured to be 5 mm.

In embodiments of the present disclosure, in the first state, the first metal shell 112 and the second metal shell 122 may be opposite to each other and the distance between the first metal shell 112 and the second metal shell 122 may not be greater than the set threshold. At this point, the first main body 11 and the second main body may be in a 360° folded state or approximately 360° folded state.

In response to the minimum distance between the radiator and the second slot 123 being not greater than the set threshold, the coupling condition may be satisfied; otherwise, the coupling condition may not be satisfied. The antenna circuit may be in the first metal shell 112, and the distance between the radiator and the first slot 113 may be fixed, so that the radiator and the first slot 113 may always satisfy the coupling condition. When the electronic device changes its state, the relative distance between the first metal shell 112 and the second metal shell 122 may change, so that the distance between the radiator and the second slot 123 may change. Based on above, when the distance between the radiator and the second slot 123 is relatively small, the second slot 123 may be coupled with the radiator, thereby solving the influence of the second metal shell 122 on the performance of the antenna.

The first slot 113 may be in the outer surface of the first metal shell 112 away from the first functional surface 111; and the second slot 123 may be in the outer surface of the second metal shell 122 away from the second functional surface 121. At least one of the first slot 113 and the second slot 123 may extend to the sidewall of a corresponding metal shell to form an opening in the sidewall. For example, at least one end of the first slot 113 may extend to the sidewall of the first metal shell 112 to form an opening in the sidewall; and/or, at least one end of the second slot 123 may extend to the sidewall of the second metal shell 122 to form an opening in the sidewall. In such way, when the distance between the first metal shell 112 and the second metal shell 122 is relatively small, on the one hand, the antenna radiation performance may be increased through the coupling between the two slots; on the other hand, the radiation performance may be improved through the sidewall opening, and signal shielding caused by the small distance between the two metal shells may be avoided.

In the manner shown in FIG. 2, at least one end of the first slot 113 may extend to the sidewall of the first metal shell 112 to form an opening in the sidewall; and both ends of the second slot 123 may be in the outer surface of the second metal shell 122 facing away from the second functional surface 121 and may have a non-zero distance from the edge of the outer surface. In other manners, both ends of the first slot 113 may be in the outer surface of the first metal shell 112 away from the first functional surface 111 and may have a non-zero distance from the edge of the outer surface. At least one end of the second slot 123 may extend to the sidewall of the second metal shell 122 to form an opening in the sidewall.

In embodiments of the present disclosure, the widths of the first slot 113 and the second slot 123 may both not be more than 3 mm, which may meet the communication requirement for the antenna to radiate signals through the slots.

In the manner shown in FIG. 2, the extending direction of the first slot 113 may be perpendicular to the extending direction of the second slot 123; and in response to being in the first state, the vertical projection of the first slot 113 on the outer surface of the second metal shell 122 may intersect the second slot 123 perpendicularly, so that the antenna radiation performance in the first state may be improved.

Figure 3:
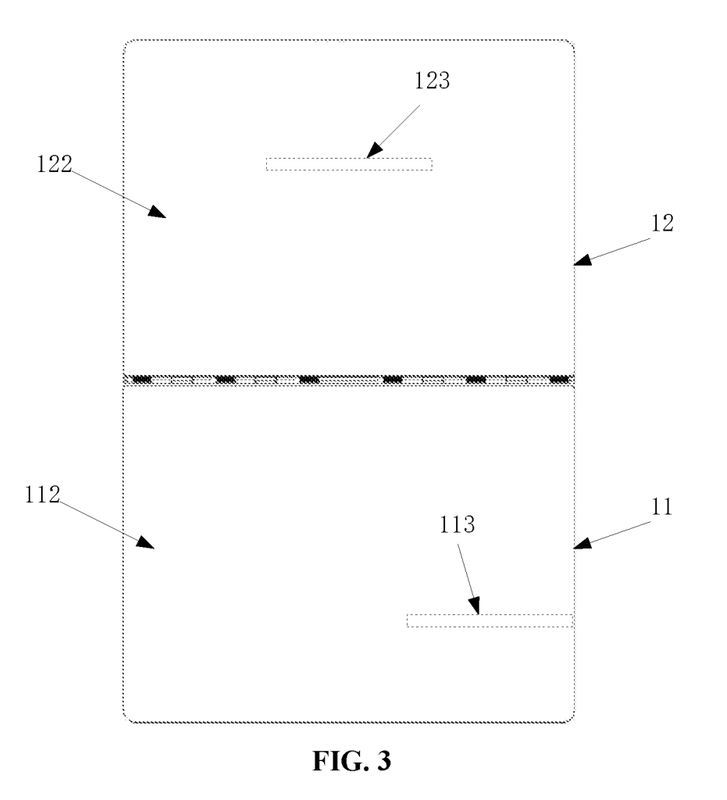
FIG. 3 illustrates a layout schematic of an antenna slot in an electronic device according to various disclosed embodiments of the present disclosure.

FIG. 3 illustrates a schematic layout diagram of an antenna slot in an electronic device according to various disclosed embodiments of the present disclosure. Different from the method shown in FIG. 2, the extending directions of the first slot 113 and the second slot 123 may be in parallel with each other in the method shown in FIG. 3. In response to being in the first state, the vertical projection of the first slot 113 on the outer surface of the second metal shell 112 may be on a same line as the second slot 123 and may at least partially cover the second slot 123, thereby improving the radiation performance of the antenna in the first state.

Figure 4:
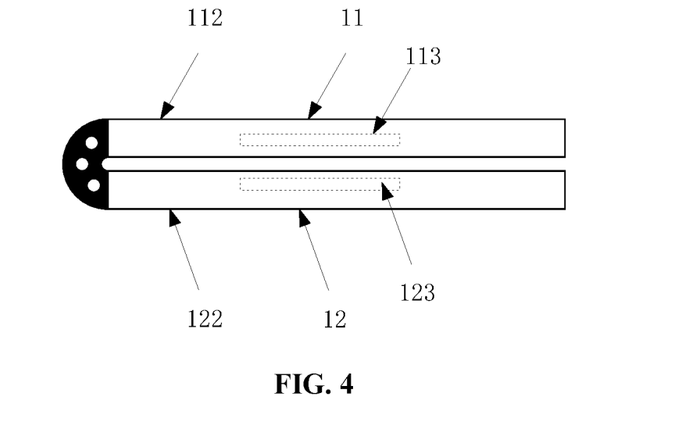
FIG. 4 illustrates another layout schematic of an antenna slot in an electronic device according to various disclosed embodiments of the present disclosure.

FIG. 4 illustrates another schematic layout diagram of an antenna slot in an electronic device according to various disclosed embodiments of the present disclosure. In such manner, the first slot 113 may be at the sidewall of the first metal shell 112, and the second slot 123 may be at the sidewall of the second metal shell 122. The first slot 113 and the second slot 123 may be at a same side of the electronic device to ensure that these two slots may satisfy the coupling condition in the first state. In the first state, the first slot 113 and the second slot 123 may be at least partially overlapped with each other, thereby improving the coupling performance of these two slots.

Figure 5:
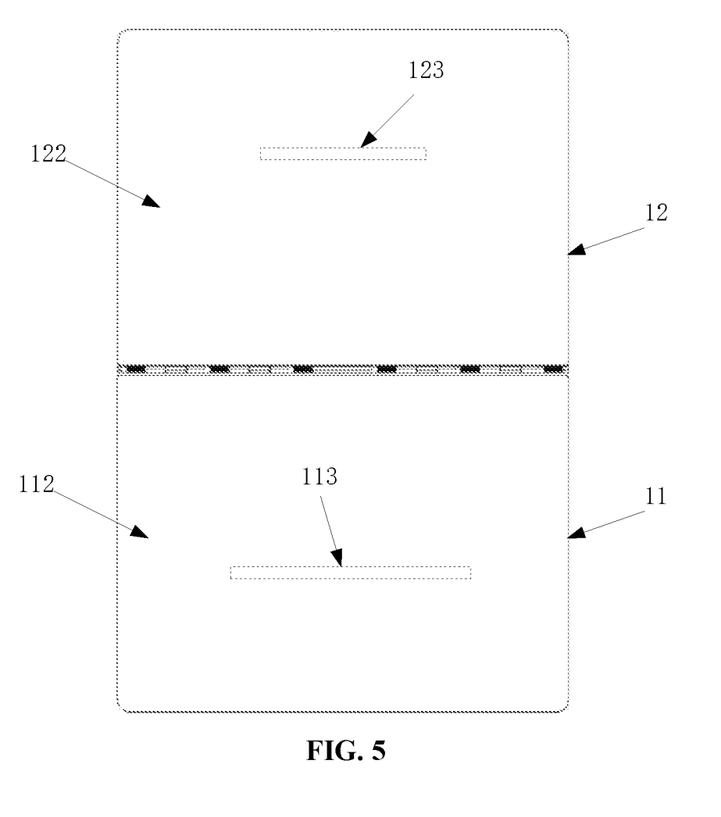
FIG. 5 illustrates another layout schematic of an antenna slot in an electronic device according to various disclosed embodiments of the present disclosure.

FIG. 5 illustrates another schematic layout diagram of an antenna slot in an electronic device according to various disclosed embodiments of the present disclosure. In such manner, the first slot 113 may be in the outer surface of the first metal shell 112 away from the first functional surface 111; and the first slot 113 and the edge of the outer surface may have a non-zero distance. The second slot 123 may be in the outer surface of the second metal shell 122 facing away from the second functional surface 121; and both ends of the second slot 123 may have a non-zero distance from the edge of the outer surface. The extending directions of the first slot 113 and the second slot 123 may be in parallel with each other. In response to being in the first state, the vertical projection of the first slot 113 on the outer surface of the second metal shell 112 may be on a same line as the second slot 123 and may at least partially cover the second slot 123, thereby improving the radiation performance of the antenna in the first state.

The lengths of the first slot 113 and the second slot 123 may be same or different, and the widths of the first slot 113 and the second slot 123 may be same or different. The size and extending direction of the two slots may be configured based on requirements and may not be limited to the methods described in embodiments of the present disclosure.

In embodiments of the present disclosure, the outer surface of the first metal shell 112 may have the first blocking layer for reducing the visibility of the first slot 113; and the outer surface of the second metal shell 122 may have the second blocking layer for reducing the visibility of the second slot 123. The first blocking layer and the second blocking layer may be both insulating layers, which are used to reduce the visibility of the antenna slot and realize the blanking function of the antenna slot. Furthermore, the first blocking layer and the second blocking layer may also have anti-wear and anti-fingerprint functions. The first slot 113 and the second slot 123 may be filled with insulating medium to ensure surface flatness of the metal shells.

In one manner, both the first blocking layer and the second blocking layer may be not light-transmitting; and the first blocking layer and the second blocking layer may be made of non-light-transmitting materials, which may suitably eliminate the visibility of the antenna slot. In such manner, the first blocking layer and the second blocking layer may be formed using ink layers of set colors, and the colors of the first blocking layer and the second blocking layer may be same or different.

In another manner, the first blocking layer may include the plurality of first light-transmitting layers and second light-transmitting layers that are alternately stacked with each other; the first light-transmitting layer and the second light-transmitting layer may have different refractive indices; and the interfere light at the interface of the first light-transmitting layer and the second light-transmitting layer may form the first preset appearance color and reduce the visibility of the first slot 113. The second blocking layer may include the plurality of third light-transmitting layers and fourth light-transmitting layers that are alternately stacked with each other; the third light-transmitting layer and the fourth light-transmitting layer may have different refractive indices; and the interface light at the interface of the third light-transmitting layer and the fourth light-transmitting layer may form the second preset appearance color and reduce the visibility of the second slot 123. In such manner, specific appearance display and blanking function of the antenna slot may be realized through film layer interference, thereby realizing more diverse appearance colors.

In embodiments of the present disclosure, the electronic device may be a notebook computer; the first main body 11 may be a keyboard main body of the notebook computer; the first function surface 111 may have a button surface; the second main body 12 may be the display screen main body of the notebook computer; and the second functional surface 121 may be a display surface. Obviously, in other manners, the first main body 11 may also be configured as the display screen main body, and the second main body 12 may be configured as the keyboard main body. As mentioned above, the electronic device may not be limited to the notebook computer but may also be a foldable or bendable electronic device such as a mobile phone, a tablet computer, and a smart wearable device.

In the electronic device described in embodiments of the present disclosure, the first main body 11 and the second main body may be folded relative to each other, and the antenna circuit may be disposed in the first metal shell 112. The antenna circuit may have the radiator; and the radiator and the first slot 113 may always meet the coupling condition. In the second state, the radiator may be coupled with the first slot 113 to form the first antenna, which may expand the bandwidth of the antenna, form the bandwidth of a required frequency band, and meet the communication requirement of the electronic device in the second state. In the first state, the electronic device may be folded at a large angle, the first slot 113 may be coupled with the second slot 123 on the second metal shell 122, and the radiator may be coupled with both the first slot 113 and the second slot 123 to form the second antenna. The influence of the second metal shell 123 in the first state may be solved by adding the second slot 123, which may ensure the communication requirement of the electronic device in the first state, therefore performance degradation and frequency offset problem of a same antenna due to different working environments may be solved. The frequency offset problem of the original antenna may be changed and adjusted by adjusting the sizes and relative position of two slots.

Various embodiments of the present disclosure are described in a progressive manner, or in a parallel manner, or in a combination of progressive and parallel manners. Each embodiment may focus on differences from other embodiments, and same and similar parts between various embodiments may be referred to each other.

As such, in the disclosed electronic device, an antenna circuit is disposed in a first metal shell. The first metal shell includes a first slot. A second metal shell includes a second slot. In the first state, the radiator satisfies a coupling condition with each of the first and the second slots of. In the second state, the radiator and the first slot satisfy a coupling condition, and the radiator and the second slot do not satisfy a coupling condition. In this manner, under the second state, the radiator and the first slot may be used as a first antenna. Under the first state, the radiator, the first slot, and the second slot may be used as a second antenna. The radiator may thus be coupled with corresponding slot(s) under different folding states, which eliminates adverse effect of the metal shell on the working environment of the antenna and ensures the communication quality of the antenna.

It should be noted that, in the description of the present disclosure, it should be understood that the orientation or positional relationship indicated by the terms "upper", "lower", "top", "bottom", "inner", "outer" and the like which is based on the orientation or positional relationship shown in the drawings may be merely for the convenience of describing the present disclosure and simplifying the description, rather than indicating or implying that indicated device or element must have a specific orientation, be constructed and operated in a specific orientation; therefore, it should not be understood as a limitation on the present disclosure. When a component is "connected" to another component, it may be directly connected to another component or there may be a centered component at the same time.

It should also be noted that in the present disclosure, relational terms such as first, second and the like may be merely used to distinguish one entity or operation from another entity or operation and may not necessarily require or imply any such actual relationship or order between these entities or operations. Moreover, the terms "include", "contain" or any other variations thereof may be intended to cover non-exclusive inclusion, so that a process, method, article, or equipment that includes a series of elements includes not only those elements, but also other elements that are not explicitly listed, or also includes elements inherent to the process, method, article, or equipment. If there are no more restrictions, the elements defined by the sentence "include a ..." does not exclude the existence of other same elements in the process, method, article, or equipment that includes the elements.

Above description of disclosed embodiments may enable those skilled in the art to make or use the present disclosure. Various modifications to these embodiments may be readily apparent to those skilled in the art, and the generic principles defined herein may be implemented in other embodiments without departing from the spirit or scope of the present disclosure. Therefore, the present disclosure may not be intended to be limited to embodiments of the present disclosure but may be accorded the widest scope consistent with the principles and novel features disclosed herein.

What is claimed is:

1. An electronic device, comprising:
a first main body and a second main body which move relative to each other, wherein the first main body has a first functional surface and a first metal shell facing away from the first functional surface; the second main body has a second functional surface and a second metal shell facing away from the second functional surface; the first metal shell has a first slot; and the second metal shell has a second slot; and
an antenna circuit disposed in the first metal shell, wherein the antenna circuit has a radiator; and the radiator and the first slot satisfy a coupling condition, wherein:
the electronic device has a first state and a second state; in response to being in the first state, the radiator and the second slot satisfy the coupling condition, and the radiator radiates a signal through the first slot and the second slot, simultaneously; and in response to being in the second state, the first slot and the second slot do not satisfy the coupling condition, and the radiator radiates the signal through the first slot.

2. The electronic device according to claim 1, wherein:
the first slot is in an outer surface of the first metal shell away from the first functional surface; and the second slot is in an outer surface of the second metal shell away from the second functional surface, wherein:
at least one of the first slot and the second slot extends to a sidewall of a corresponding metal shell to form an opening at the sidewall.

3. The electronic device according to claim 1, wherein:
the first slot is at a sidewall of the first metal shell, and the second slot is at a sidewall of the second metal shell.

4. The electronic device according to claim 1, wherein:
a width of each of the first slot and the second slot is not more than 3 mm.

5. The electronic device according to claim 1, wherein:
an extending direction of the first slot is in parallel with an extending direction of the second slot; and
in response to being in the first state, a vertical projection of the first slot on an outer surface of the second metal shell is at a same line as the second slot and at least partially covers the second slot.

6. The electronic device according to claim 1, wherein:
an extending direction of the first slot is perpendicular to an extending direction of the second slot; and
in response to being in the first state, a vertical projection of the first slot on an outer surface of the second metal shell intersects the second slot perpendicularly.

7. The electronic device according to claim 1, wherein:
an outer surface of the first metal shell has a first blocking layer for reducing visibility of the first slot; and
an outer surface of the second metal shell has a second blocking layer for reducing visibility of the second slot.

8. The electronic device according to claim 7, wherein:
each of the first blocking layer and the second blocking layer is not light-transmitting.

9. The electronic device according to claim 7, wherein:
the first blocking layer includes a plurality of first light-transmitting layers and second light-transmitting layers which are alternately stacked with each other; a first light-transmitting layer and a second light-transmitting layer have different refractive indices; and interfere light at an interface of the first light-transmitting layer and the second light-transmitting layer forms a first preset appearance color and reduces the visibility of the first slot; and
the second blocking layer includes a plurality of third light-transmitting layers and fourth light-transmitting layers which are alternately stacked with each other; a third light-transmitting layer and a fourth light-transmitting layer have different refractive indices; and interface light of an interface of the third light-transmitting layer and the fourth light-transmitting layer forms a second preset appearance color and reduces the visibility of the second slot.

10. The electronic device according to claim 1, wherein:
each of the first blocking layer and the second blocking layer is formed using an ink layer.

11. The electronic device according to claim 1, wherein:
a minimum distance between the radiator and the first slot is not greater than a set threshold, such that the radiator and the first slot satisfy the coupling condition; and
in response to the minimum distance between the radiator and the second slot being not greater than the set threshold, the coupling condition is satisfied, and in response to the minimum distance between the radiator and the second slot being greater than the set threshold, the coupling condition is unsatisfied.

12. The electronic device according to claim 11, wherein:
the set threshold is configured to be about 5 mm.

13. The electronic device according to claim 1, wherein:
lengths of the first slot and the second slot are same or different.

14. The electronic device according to claim 1, wherein:
each of the first slot and the second slot is filled with an insulating medium.

15. The electronic device according to claim 1, wherein:
the first main body is a keyboard main body, and the second main body is a display screen main body; or
the first main body is a display screen main body, and the second main body is a keyboard main body.

* * * * *